J. L. HAMMOND.
CYLINDER ROLLER FILM STEADIER FOR MOVING PICTURE MACHINES.
APPLICATION FILED JULY 14, 1908.
917,727. Patented Apr. 6, 1909.
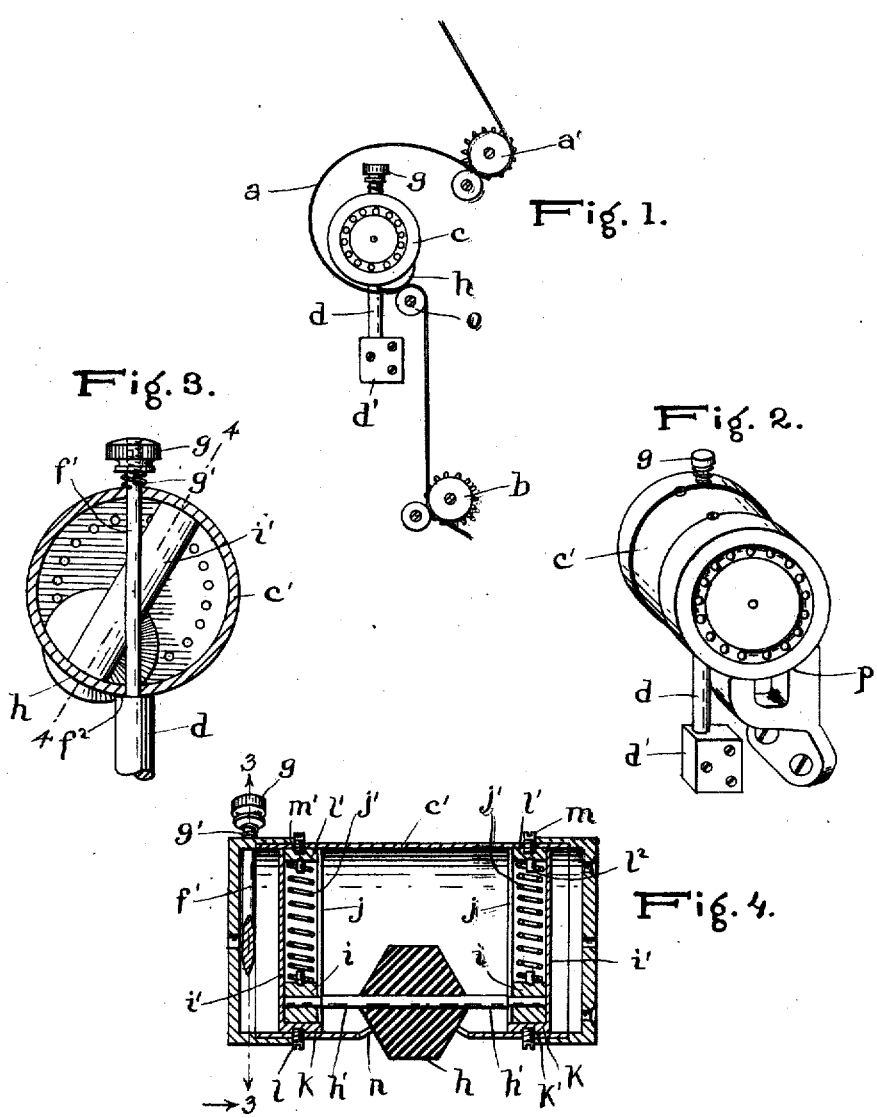

UNITED STATES PATENT OFFICE.

JOHN L. HAMMOND, OF MACON, MISSOURI, ASSIGNOR OF ONE-HALF TO JOHN W. PATTON, OF MACON, MISSOURI.

CYLINDER-ROLLER FILM-STEADIER FOR MOVING-PICTURE MACHINES.

No. 917,727.     Specification of Letters Patent.     Patented April 6, 1909.

Application filed July 14, 1908. Serial No. 443,494.

*To all whom it may concern:*

Be it known that I, JOHN L. HAMMOND, a citizen of the United States, resident of Macon, in the county of Macon and State of Missouri, have made a certain new and useful Invention in Cylinder-Roller Film-Steadiers for Moving-Picture Machines; and I declare the following to be a full, clear, and exact description of the same, such as will enable others skilled in the art to which it appertains to make and use the invention, reference being had to the accompanying drawings, and to letters of reference marked thereon, which form a part of this specification.

Figure 1 is an end view of the invention as applied. Fig. 2 is a perspective view of the invention showing the seat for holding the roller against the film. Fig. 3 is a section on the line 3—3, Fig. 4. Fig. 4 is a section on the line 4—4, Fig. 3.

The invention relates to means for steadying the films of moving picture machines, having for its object to prevent the objectionable jumping or quivering of the picture, which is held absolutely still, extending the life of a film more than double, and extending the life of the machine, the invention being capable of attachment to any moving picture machine at small cost.

Other objects and advantages will hereinafter appear.

In the accompanying drawings, illustrating the invention, the letter $a$, designates the film, having the usual marginal perforations; $a'$, and $b$, the feed sprocket wheels of the machine engaging such perforations.

$c$, is the film steadying device comprising a hollow cylinder carrier $c'$, having a standard support $d$, at one end thereof, said support being secured at its lower end in suitable supporting bearings shown at $d'$. The carrier $c'$, is pivotally mounted upon a reduced upper portion $f'$, of the standard $d$, resting upon the shoulder $f^2$, at the base of such reduced portion, a set nut $g$, having bearing against a short coil spring $g'$, fitting around the upper end portion of the part $f'$, and bearing at its lower end upon the carrier $c'$, serving when the spring is put under tension by the set screw to check the free movement of the carrier upon the standard or to act in the nature of a brake upon such movement.

$h$, is a friction roller of soft rubber or other suitable material, said roller having at each side thereof metal journal extensions $h'$, $h'$, provided with bearings in journal blocks $i$, $i$, mounted in vertical barrels $i'$, $i'$, secured within the carrier at the end portions thereof. Each barrel $i'$, is vertically slotted at $j$, to allow movement of the extension $h'$ therein, a coil spring $j'$, fitting in the barrel and bearing at its lower end upon the journal block, which bears at its lower end upon the solid bottom $k$, of the barrel having a threaded opening $k'$, for engagement with the securing screw $l$. The coil spring and journal block are slipped in from the open upper end portion of the barrel, an upper bearing piece $l'$, lying above the spring and having a reduced portion $l^2$, engaging within the coils thereof. The upper securing screw $m$, has engagement with a depression $m'$, of the bearing piece whereby all the parts are securely held in position. The friction roller projects partly without the cylinder carrier through a central slot $n$, of its lower wall, such roller being held in projected position by the action of the coil springs $j'$, $j'$, and inward movement of the friction roller, while being allowed, is resisted by the action of such springs, whereby the roller is held under spring tension.

In the application of the invention, the cylinder carrier is turned upon its standard support to one side toward the door of the machine, and the film having been adjusted in position, the cylinder carrier is turned back toward the film, so that the rubber friction roller will engage the same, said roller bearing against a roller $o$, over which the film passes, and against which it is pressed by the rubber roller.

The cylinder carrier is allowed a slight upward movement at its free end owing to the coil spring $g'$, against which the set screw $g$, has bearing, and as the carrier is turned toward the film, this slight lift allowed enables the carrier to engage at its free end in stationary seat $p$, of the machine, whereby the carrier and its friction roller are securely held in position with the film compressed by the rubber roller against the lower roller $o$, to a slight extent, which is sufficient to prevent any unnecessary movement of the film and does not in any way prevent its free passage or feed through such rollers nor injure the film or negative in any way.

The use of the invention causes a steady pull on the film in one direction and will result in a perfect picture upon the curtain or screen until the marginal holes of the film wear absolutely together.

Inasmuch as the film is prevented from playing backward and forward on the feed sprocket wheels that engage with the marginal perforations, the life of these wheels, which are made of soft brass and are somewhat expensive, is largely extended.

Having thus described the invention, what I claim as new and desire to secure by Letters Patent is:

1. In a roller film steadier for moving picture machines, an upright standard, a roller carrier pivoted at one end to the standard to swing laterally with reference thereto, a friction roller in the carrier and a guide roller below the friction roller.

2. In a roller film steadier for moving picture machines, a guide roller, a swinging roller carrier, and a friction roller in the carrier and capable of being swung therewith toward and away from the guide roller.

3. In a roller film steadier for moving picture machines, a carrier having a pivotal support at one end thereof, and a spring-pressed friction roller mounted in said carrier, adapted to coöperate with the guide roller of the machine to steady the film and capable of swinging with the carrier upon the pivotal support as a center toward or away from the film.

In testimony whereof I affix my signature, in presence of two witnesses.

JOHN L. HAMMOND.

Witnesses:
GEORGE W. JAEGER,
PEARL H. HALL.